(12) United States Patent
Risse et al.

(10) Patent No.: US 7,438,879 B2
(45) Date of Patent: Oct. 21, 2008

(54) PURIFICATION DEVICE FOR FLUE GAS WITH DIVIDED SCRUBBING LIQUID SUMP

(75) Inventors: Theo Risse, Werne (DE); Christian Moser, Essen (DE)

(73) Assignee: Lentjes GmbH (DE)

( * ) Notice: Subject to any disclaimer, the term of this patent is extended or adjusted under 35 U.S.C. 154(b) by 366 days.

(21) Appl. No.: 11/287,003

(22) Filed: Nov. 23, 2005

(65) Prior Publication Data
US 2006/0210460 A1    Sep. 21, 2006

(30) Foreign Application Priority Data
Mar. 18, 2005    (EP) ................... 05005922

(51) Int. Cl.
*B01D 53/50* (2006.01)
*B01J 10/00* (2006.01)

(52) U.S. Cl. .................. 423/243.01; 423/243.08; 422/105; 422/108; 422/168

(58) Field of Classification Search ............... 423/210, 423/243.01, 243.08; 422/168, 105, 108
See application file for complete search history.

(56) References Cited

U.S. PATENT DOCUMENTS

| | | | |
|---|---|---|---|
| 3,800,505 A | 4/1974 | Tarves, Jr. | |
| 3,948,608 A | 4/1976 | Weir, Jr. | |
| 4,374,813 A | 2/1983 | Chen et al. | |
| 4,539,184 A * | 9/1985 | Stehning | 422/170 |
| 4,606,867 A | 8/1986 | Eguchi | |
| 4,976,751 A | 12/1990 | Schippert | |
| 5,199,263 A | 4/1993 | Green et al. | |
| 5,540,760 A | 7/1996 | Risse et al. | |
| 5,648,048 A | 7/1997 | Kuroda et al. | |
| 5,788,944 A | 8/1998 | Kikkawa et al. | |
| 5,826,518 A | 10/1998 | Bhat et al. | |
| 5,993,640 A | 11/1999 | Risse | |
| 2003/0089242 A1 | 5/2003 | Wakamatsu et al. | |
| 2003/0116018 A1 | 6/2003 | Echizen et al. | |

FOREIGN PATENT DOCUMENTS

| | | |
|---|---|---|
| CA | 1 251 919 | 4/1989 |
| CA | 2135430 | 11/1994 |
| CA | 2 493 769 | 2/2004 |
| DE | 43 29 427 C2 | 9/1993 |
| DE | 44 06 684 A1 | 3/1994 |
| DE | 195 39 084 A1 | 10/1995 |
| DE | 197 51 851 A1 | 11/1997 |
| DE | 100 58 548 C1 | 11/2000 |
| EP | 0162536 | 2/1985 |
| EP | 0363009 | 9/1989 |
| EP | 0945164 | 10/1997 |
| JP | 10-192646 | 7/1998 |
| JP | 2002-035545 | 2/2002 |
| KR | 10-0301564 | 6/2001 |
| KR | 10-2005-0007488 | 1/2005 |
| RU | 2 124 932 C1 | 1/1999 |
| WO | WO 03/082444 A1 | 10/2003 |
| WO | WO 2004/011127 A1 | 2/2004 |

* cited by examiner

*Primary Examiner*—Timothy C Vanoy
(74) *Attorney, Agent, or Firm*—Harness, Dickey & Pierce, P.L.C.

(57) ABSTRACT

A device provides the purification of flue gas comprising a scrubbing liquid sump divided into several basins and a pump device, which pumps the scrubbing liquid from at least one basin of the scrubbing liquid sump to scrubbing liquid nozzles.

10 Claims, 6 Drawing Sheets

PURIFICATION DEVICE FOR FLUE GAS WITH DIVIDED SCRUBBING LIQUID SUMP

The present invention relates to a device and a method for purifying flue gas, in particular for desulfurizing exhaust gas of a coal power station or the like.

Purification devices are already known. Normally they comprise a scrubbing column having scrubbing liquid nozzles, which are often arranged on several levels, a scrubbing liquid sump, in which scrubbing liquid is collected, and an absorption area, which extends inside a cylindric receptacle of the scrubbing column from the scrubbing liquid sump towards the upper scrubbing liquid nozzle level. Flue gas is introduced into a lower section of the absorption area in the scrubbing column, flows upwards from there and leaves the scrubbing column through an outlet provided above the scrubbing liquid nozzles. On its way through the scrubbing column, the flue gas gets into contact with scrubbing liquid emerging from the scrubbing liquid nozzles and is desulfurized, which will be described in more detail below. Such a purification device is for example known from DE-A-100 58 548.

The scrubbing liquid preferably contains, apart from water, alkaline earths, which react with the sulphur oxides present in the flue gas and the sulphur oxides generated in the scrubbing column. Lime in form of calcium oxide, calcium hydroxide, calcium carbonate or the like is in particular used.

The alkaline earths react with the sulphur oxides present in the flue gas essentially to calcium sulphide, which is bound in the scrubbing liquid. In this manner, the flue gas is purified from the undesirable sulphur oxides and flows out of the purification device afterwards. However, the scrubbing liquid containing the calcium sulphide particles, which are kept floating in this one, flows into the scrubbing liquid sump and is collected there.

Calcium sulphate, which is generated during the flue gas purification, has similar positive properties as natural gypsum. It is thus a desired by-product of the flue gas purification process, which is won from the scrubbing liquid collected in the scrubbing liquid sump. The calcium sulphate particles are removed together with the scrubbing liquid from the scrubbing liquid sump and are then extracted from the scrubbing liquid in a subsequent process. The calcium sulphate can then be further processed to materials, in particular construction materials.

For winning calcium sulphate of good quality it has to be taken care that as few alkaline earths as possible are contained in the scrubbing liquid collected in the scrubbing liquid sump, when the scrubbing liquid is removed from the scrubbing liquid sump for winning calcium sulphate.

Accordingly, nearly all alkaline earths admixed to the scrubbing liquid should react with the sulphur oxides contained in the flue gas to be purified during the flue gas purification process.

Such a complete reaction of the alkaline earths can be obtained by different measures, which can also be carried out together.

On the one hand, one can strive for an improved reaction between the reaction partners in order to increase the probability of a corresponding reaction.

The reaction of alkaline earths and sulphur oxides to calcium sulphide is realized by diffusion and/or solution at the contact surface between scrubbing liquid and flue gas. Thus, the larger the contact surface is, the better will be the achieved reaction. The contact surface is conversely proportional to the size or diameter of the scrubbing liquid droplets, which leave the scrubbing liquid nozzles. Accordingly, it is proposed in CA-A-1 251 919 to atomize the scrubbing liquid as finely as possible by means of the scrubbing liquid nozzles, in order to reduce the size of the scrubbing liquid droplets in this way and correspondingly to increase the total contact surface between scrubbing liquid and the flue gas to be purified.

A nearly complete reaction of the alkaline earths during the flue gas purification process can also be achieved in that the residence time of the scrubbing liquid in the absorption area of the scrubbing column is prolonged, in order to give the alkaline earths enough opportunity to react with sulphur oxides in the flue gas. In this way, the probability is increased that every alkaline earth particle participates in such a reaction. For increasing the residence time of the scrubbing liquid in the absorption area of the scrubbing column, CA-A-1 252 919 for example proposes to make the scrubbing liquid circulate several times between scrubbing liquid sump and scrubbing liquid nozzles, such that this one passes more often through the absorption area of the scrubbing column.

Another problem of winning calcium sulphate of high quality is finally that in the reaction of the scrubbing liquid with the flue gas, not only calcium sulphate is produced but also undesirable by-products, such as for example sulphites, in particular calcium sulphite, which render the calcium sulphate impure.

In order to reduce the portion of these undesirable sulphites in the scrubbing liquid present in the scrubbing liquid sump, it is proposed in U.S. Pat. No. 4,539,184 to introduce oxygen in form of air or the like into at least one zone of the scrubbing liquid sump, in order to oxidize calcium sulphites, which are present there, to calcium sulphate.

It is one object of the present invention to provide a device and a method for the purification of flue gas, in particular flue gas from a coal power station, in which the reaction between the alkaline earths, which are dissolved in the scrubbing liquid, and the sulphur oxides, which are present in the flue gas, is further optimized.

The above mentioned aim is achieved according to the present invention by a device for desulphurization of flue gas comprising a receptacle having scrubbing liquid nozzles arranged in a vertical orientation in an upper section of said receptacle and a scrubbing liquid sump for receiving scrubbing liquid in a lower section of said receptacle, wherein said scrubbing liquid sump is divided into a first basin and a second basin by means of a dividing wall, wherein said dividing wall rises above the uppermost liquid level of the scrubbing liquid sump, wherein said dividing wall comprises means for level equilibration in said scrubbing liquid sump and allows a scrubbing liquid exchange between said basins, wherein an oxidation mean is provided at least in said first basin to selectively oxidize calcium sulphites to calcium sulphates, and a method for flue gas desulphurization using the above mentioned device, wherein the scrubbing liquid contained in the first basin has a different additive concentration from a additive concentration of the scrubbing liquid contained in the second basin during operation, wherein said device is operable to provide scrubbing liquid from the basin having a lower additive concentration for a preliminary purification of the flue gas and to provide scrubbing liquid from the basin having a higher additive concentration for a final purification of the flue gas, wherein said device is operable to extract scrubbing liquid from the basin having the lower additive concentration exclusively for producing calcium sulphate.

The device according to the invention for the purification of flue gas comprises a scrubbing liquid sump which is divided into several basins. The scrubbing liquid, which leaves the absorption area, is collected in at least one basin. It can then be at least partially removed from there for winning calcium sulphate. In at least one other basin, the fresh additive, e.g. limestone, is added.

The division of the scrubbing liquid sump into at least two basins has the advantage that the addition of the additive and the extraction of scrubbing liquid, which is required for winning calcium sulphate, can be locally separated. The addition of an additive is necessary in order to provide the scrubbing liquid with the reaction partners, that are required for the purification, in form of alkaline earths, but on the other hand, a too high additive concentration shall be avoided, since such additives which do not participate in a reaction in the absorption area, render the scrubbing liquid used for winning calcium sulphate in the scrubbing liquid sump impure.

For a preliminary purification of the flue gas, the scrubbing liquid required for the purification process is taken from the basin having a low additive concentration and for the final purification it is taken from the basin, in which the additives are added. A high additive concentration used in this special way leads to an optimized purification performance. The scrubbing liquid for winning calcium sulphate is extracted from the basin having a low additive concentration, so that calcium sulphate of a better quality can be produced.

For dividing the scrubbing liquid sump into several basins, preferably at least one dividing wall is provided. The dividing wall preferably comprises means for equalizing the levels in the scrubbing liquid sump, e.g. through holes, which allow an exchange of scrubbing liquid between the basins to a small extend.

According to a preferred embodiment of the present invention, this one comprises a scrubbing liquid analyzer, which preferably continuously analyses scrubbing liquid samples. This scrubbing liquid analyzer permits to analyse the composition of the scrubbing liquid, the pH value of the scrubbing liquid or the like. Accordingly it can be assured that the scrubbing liquid, which is guided into the absorption area, and the scrubbing liquid, which is extracted for winning calcium sulphate, always have the optimum composition, the desired pH value or the like.

Furthermore, according to another embodiment of the present invention it is advantageous that at least one side of the receptacle is formed, such that the volume of the absorption area increases or decreases from a flue gas inlet towards a flue gas outlet, so that the flue gas flowing through the absorption area is correspondingly slowed down or accelerated, which in turn has corresponding effects on the residence time of the flue gas in the absorption area. The at least one receptacle side can be for example the upper side, one or several side walls or a corresponding combination thereof.

In the method according to the invention, the scrubbing liquid in the single basins of the scrubbing liquid sump has different compositions, at least during operation. During operation, scrubbing liquid from the first basin on the side of the gas inlet is pumped towards scrubbing liquid nozzles on the side of the gas inlet and scrubbing liquid from the second basin on the side of the gas outlet is pumped towards scrubbing liquid nozzles on the side of the gas outlet. The scrubbing liquid from the first basin is thus used for the preliminary purification and the scrubbing liquid from the second basin is used for the final purification of the flue gas. After a certain period, a natural additive concentration gradient is achieved in the scrubbing liquid from the first basin towards the second basin. Thus, the additive concentration of the scrubbing liquid in the scrubbing liquid sump increases in the direction of the second basin, where it reaches a maximum.

Finally, according to a preferred embodiment of the method, the scrubbing liquid for winning calcium sulphate is only extracted from one basin of the scrubbing liquid sump, preferably from the basin, in which the scrubbing liquid has the lowest additive concentration. Accordingly, it is possible to win calcium sulphate of high quality.

In the following, the present invention is described in more detail with reference to the drawing. Therein.

Figure 1:
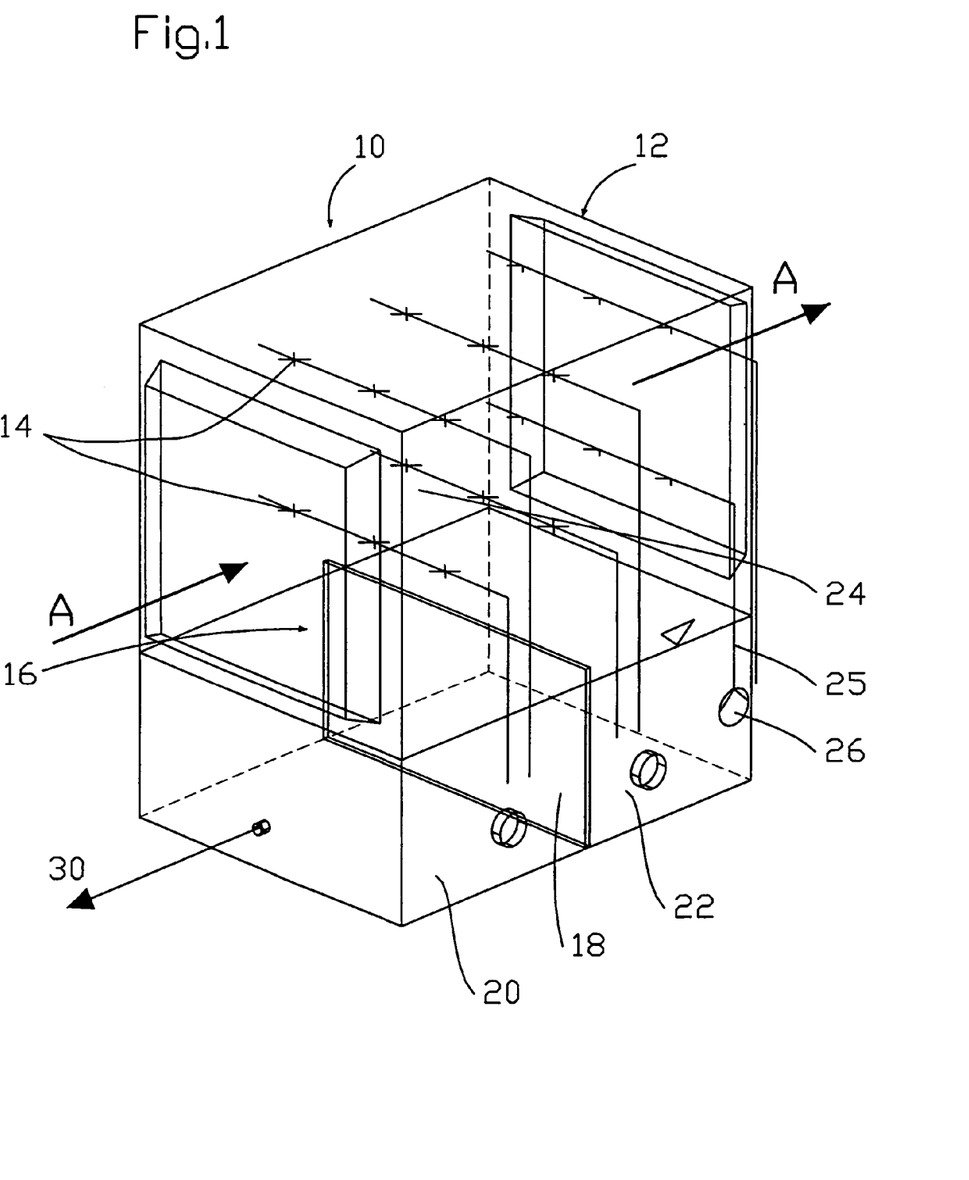
FIG. 1 is a perspective view of a first embodiment of the device for flue gas purification according to the invention.

FIG. 1 shows a perspective view of a first embodiment of the device 10 for flue gas purification according to the invention, wherein the walls of device 10 are represented as "transparent" for a better view, such that the components inside device 10 are visible. Besides, this is the same for the devices represented in FIGS. 2 through 6. The flue gas is preferably a flue gas of a coal power station or the like. Device 10 comprises a receptacle 12, which preferably has a parallelepiped form. In an upper section of receptacle 12, scrubbing liquid nozzles 14 are arranged, which can be placed on different levels and be oriented in different directions, e.g. horizontally or vertically, wherein a vertical orientation of the scrubbing liquid nozzles 14 is preferred. In the lower section of receptacle 12, a scrubbing liquid sump 16 for receiving scrubbing liquid is provided. The scrubbing liquid sump 16 is divided into a first basin 20 and a second basin 22 by means of a dividing wall 18. Herein, said dividing wall 18 rises above the uppermost liquid level of the scrubbing liquid sump, so that the two basins 20 and 22 are completely separated from each other. In the dividing wall, non represented openings for the level equilibration in the scrubbing liquid sump are provided, which allow a scrubbing liquid exchange between the basins 20 and 22 to a small extend. Receptacle 12 comprises an absorption area 24 between the scrubbing liquid nozzles 14 and the scrubbing liquid sump 16, through which absorption area flue gas to be desulfurized is horizontally guided in the direction of the arrows A from the flue gas inlet 17 towards the flue gas outlet 19, when device 10 is in the operating state. Scrubbing liquid is sprayed in form of a fine mist onto the flue gas flowing through absorption area 24 by means of the scrubbing liquid nozzles 14. The alkaline earths contained in the scrubbing liquid, such as for example calcium carbonate, react with the sulphur oxides in the flue gas, whereby calcium sulphite is essentially formed, which in turn is bound in the scrubbing liquid. In this manner, the flue gas flowing through absorption area 24 is desulfurized.

The scrubbing liquid, which leaves absorption area 24 and which contains the calcium sulphates, congregates in the scrubbing liquid sump 16 and this both in the first basin 20 and in the second basin 22. In basin 20 and/or basin 22, the respectively contained scrubbing liquid is analysed by means of a non represented scrubbing liquid analyser, i.e. the scrubbing liquid composition and/or the pH value of the scrubbing liquid is determined.

If the parameters of the scrubbing liquid contained in the first basin, which have been determined by means of the non represented analyser, coincide with desired scrubbing liquid parameters for winning the calcium sulphate, scrubbing liquid is extracted from the first basin 20 via a corresponding pipe 30. Pipe 30, even if not represented, comprises the means required for the extraction of scrubbing liquid, such as e.g. valves, pumps or the like.

In the second basin 22, additives in form of alkaline earths are added in batches or continuously in order to replace such alkaline earths in the scrubbing liquid, which react with the sulphur oxides present in the flue gas in absorption area 24. In this way, the scrubbing liquid always comprises the additives required for the purification process. The addition of alkaline earths can also be carried out on the base of the previously mentioned analytical findings.

In basins 20 and 22, but in particular in basin 20, an oxidation means is preferably provided in order to oxidize the undesirable calcium sulphites, which are present in liquid sump 16, to calcium sulphate. This oxidation means, which is not represented here, can be for example an oxygen supply in form of air, wherein the air is preferably supplied through pipes having corresponding air outlets, which are horizontally provided in basin 20 and/or basin 22.

Pumps 26 pump the scrubbing liquid collected in scrubbing liquid sump 16 finally back to the scrubbing liquid nozzles 14. Herein, the scrubbing liquid extracted from the first basin 20 is returned to the nozzles 14 close to the gas inlet for the preliminary purification of the flue gas and the scrubbing liquid extracted from the second basin 22 is returned to the nozzles 14 close to the gas outlet for the final purification of the flue gas. Accordingly, an additive concentration gradient is produced in the scrubbing liquid, namely from a low concentration in the first basin 20 towards a maximum concentration in the second basin 22. In this way, scrubbing liquid having a very low additive concentration can always be extracted from basin 20 for winning calcium sulphate.

Figure 2:
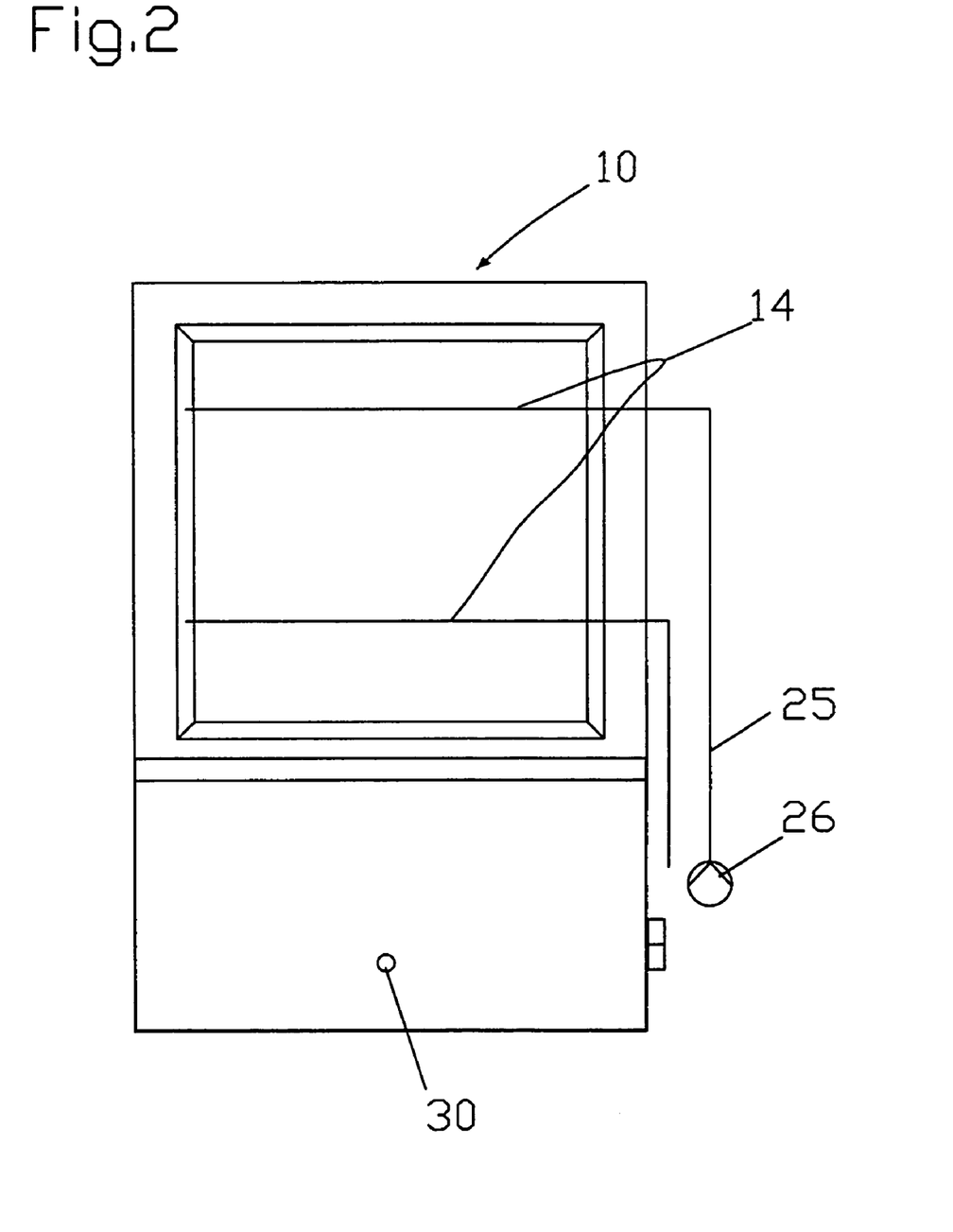
FIG. 2 is a side view of the first embodiment of the device according to the invention represented in FIG. 1.

FIG. 2 is a perspective view of device 10 represented in FIG. 1. In FIG. 2 one can see that the scrubbing liquid nozzles 14 are arranged on several levels.

Figure 3:
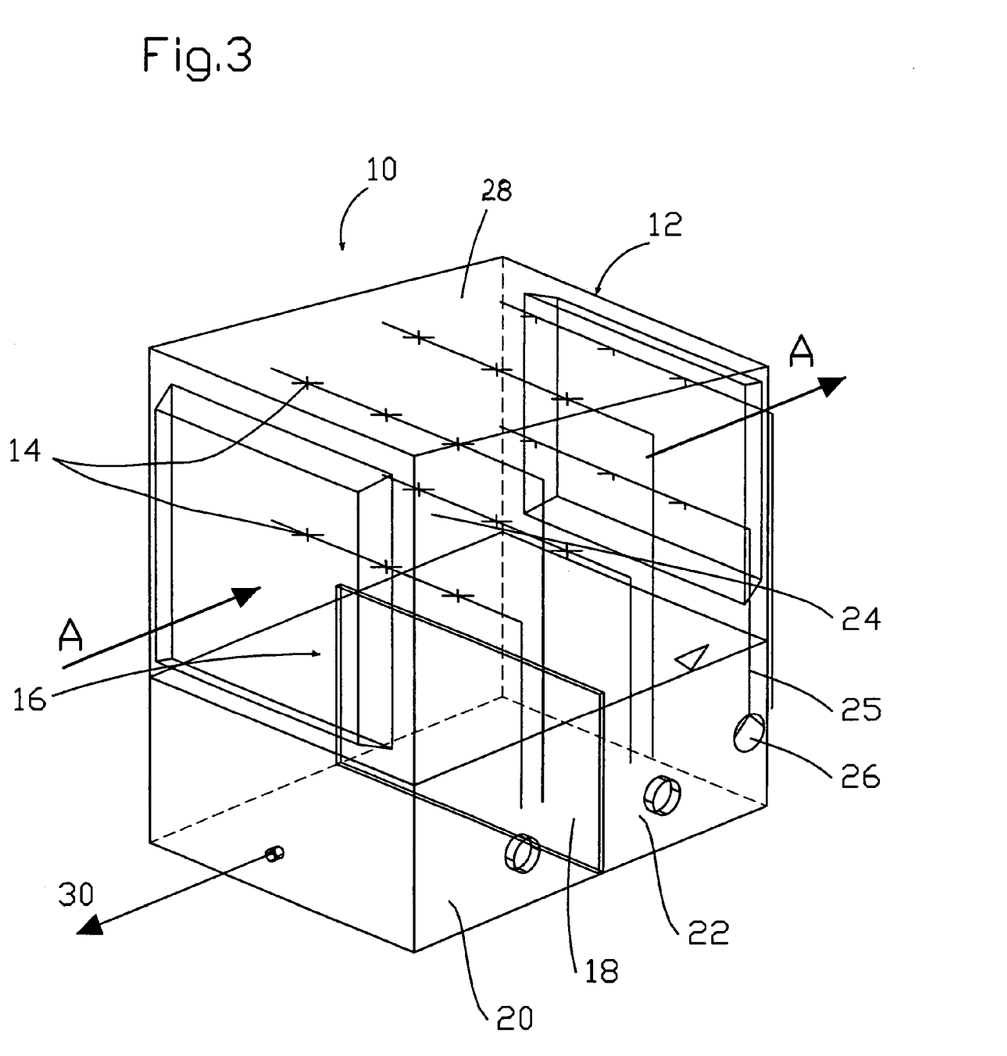
FIG. 3 is a perspective view of a second embodiment of the device for flue gas purification according to the invention.

FIG. 3 is a perspective view of a second embodiment of the device for flue gas purification according to the invention. The device 10 represented in FIG. 3 is essentially different from the device 10 represented in FIGS. 1 and 2 in that the upper side 28 is angled inwards in such a way that the volume of absorption area 24 becomes smaller from the flue gas inlet 17 towards the flue gas outlet 19. In this exemplary embodiment, the flue gas inlet 17 is also larger than the flue gas outlet 19. Due to this form of receptacle 12 as well as of flue gas inlet and flue gas outlet 17 and 19, the flue gas flowing through absorption area 24 is accelerated in receptacle 12, such that the velocity of the flue gas increases and thus the residence time in receptacle 12 and thus in absorption area 24 is shortened.

Figure 4:
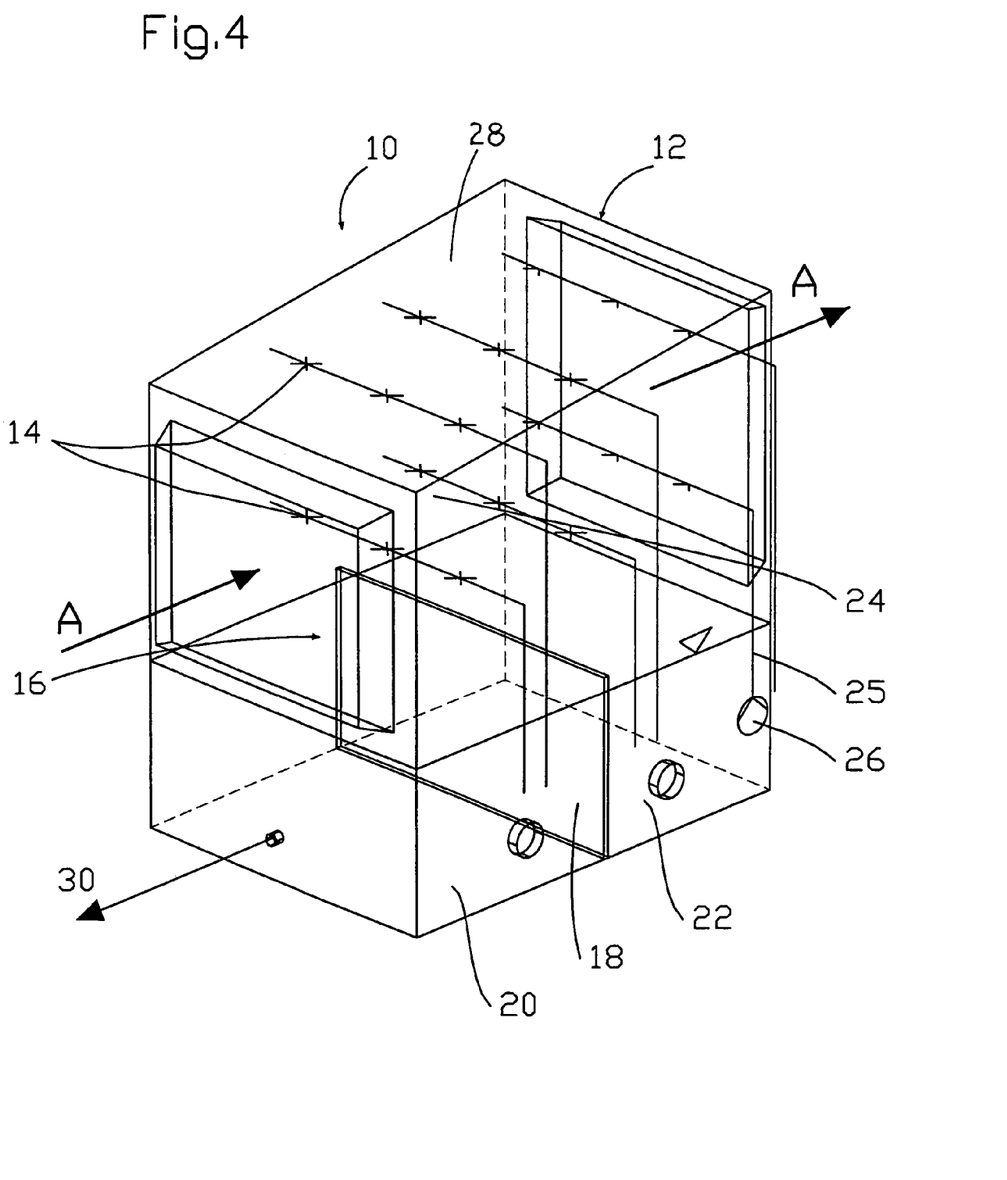
FIG. 4 is a perspective view of another embodiment of the device for flue gas purification according to the invention.

FIG. 4 shows still another embodiment of the device for flue gas purification according to the invention. In contrast to the device represented in FIG. 3, the upper side 28 of receptacle 12 is angled outwards in such a way that the volume of absorption area 24 increases from flue gas inlet 17 towards flue gas outlet 19, wherein flue gas inlet 17 is correspondingly smaller than flue gas outlet 19. In this way, the flue gas is relieved on its way through absorption area 24 of receptacle 12 from flue gas inlet 17 towards flue gas outlet 19, so that the velocity thereof decreases and thus the residence time thereof in absorption area 24 is prolonged.

Figure 5:
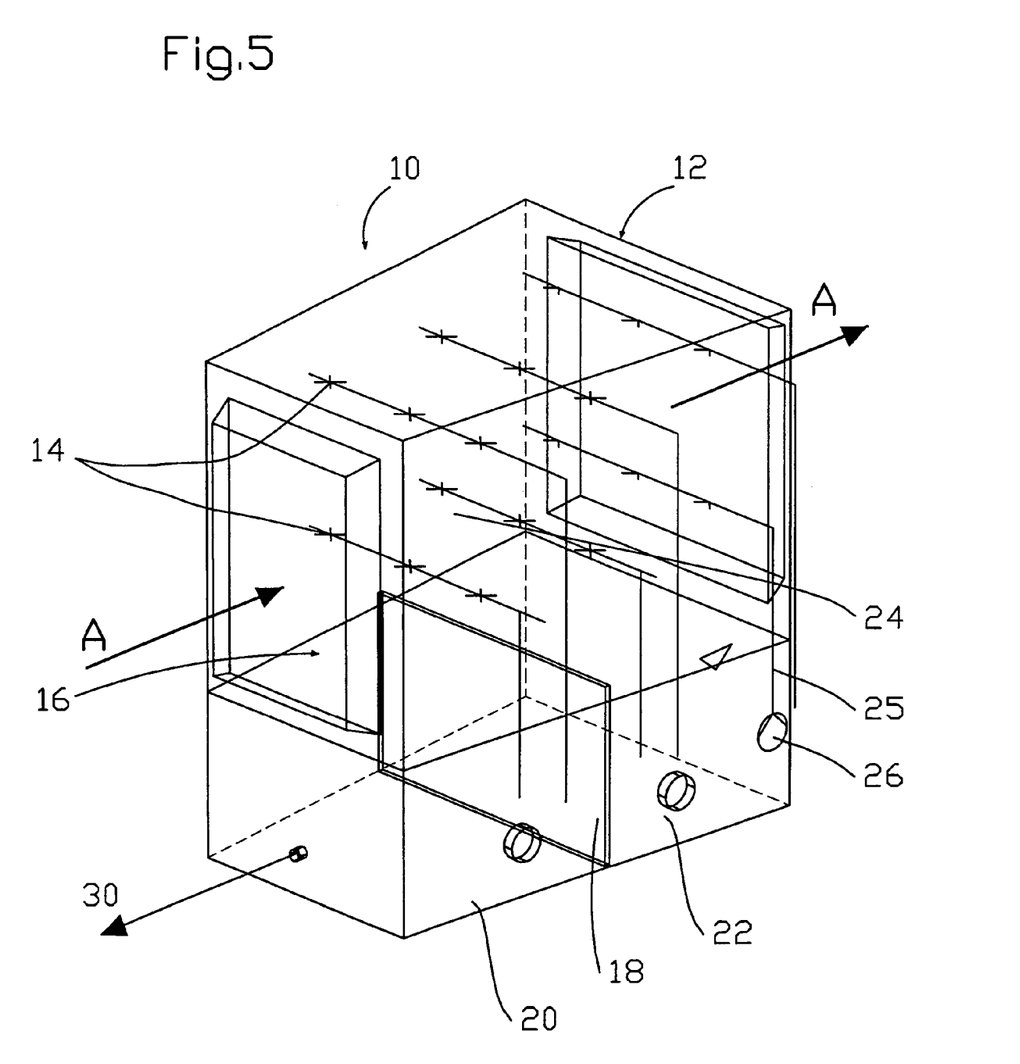
FIG. 5 is a perspective view of a fourth embodiment of the device for flue gas purification according to the invention and FIG. 6 is a perspective view of a fifth embodiment of the device for flue gas purification according to the invention.

FIG. 5 is a perspective view of a fourth embodiment of the device for flue gas purification according to the invention, which essentially corresponds to the embodiment represented in FIG. 4. However, according to FIG. 5, the side walls of receptacle 12 instead of the upper side 28 of receptacle 12 are angled outwards in such a way that the volume of absorption area 24 increases from flue gas inlet 17 towards flue gas outlet 19.

Figure 6:
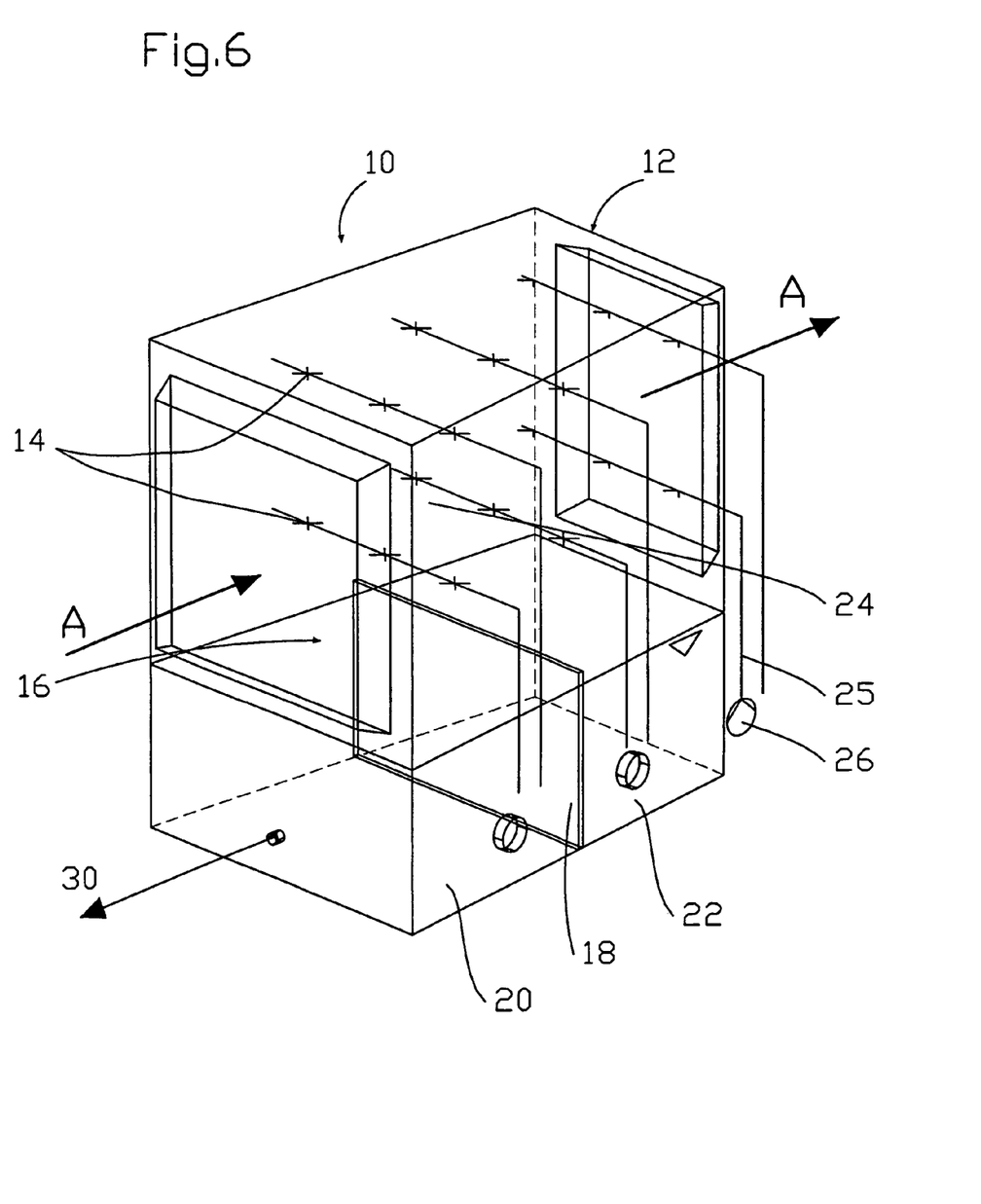

FIG. 6 finally is a perspective view of a fifth embodiment of the device for flue gas purification according to the invention, which is essentially similar to the embodiment represented in FIG. 3, wherein the side walls of the receptacle instead of the upper side 28 of receptacle 12 are angled inwards in such a way that the volume of absorption area 24 decreases from flue gas inlet 17 towards flue gas outlet 19

The embodiments of the device according to the invention, which are represented in FIGS. 1 through 6, comprise each an oxidation means in the scrubbing liquid sump, which oxidation means is not represented in the figures to simplify matters. By means of this oxidation means, oxygen is introduced into the scrubbing liquid sump, which reacts with calcium sulphites to calcium sulphate.

It is to be understood that the above described preferred embodiment is not limiting, and thus other modifications and changes are possible without leaving the protected scope of the invention defined by the annexed claims.

For example, the dividing wall 18 does not have to completely divide both basins 20 and 22, so that an exchange of scrubbing liquid between the two basins is possible to a certain extend.

Furthermore, only one of the two basins 20 or 22 can be provided with a scrubbing liquid analyzer and/or an oxidation device.

Furthermore, the flue gas can also flow through device 10 from the lower part to the upper part, i.e. the flue gas enters for example a lower section of absorption area 24 of receptacle 12 and leaves this one on the right side above the scrubbing liquid nozzles 14 through a corresponding opening. But we like to point out, that a horizontal through flow of the flue gas through receptacle 12, such as represented in FIG. 1, is preferred.

The scrubbing liquid sump can also comprise more than two basins.

Finally, the device according to the invention and the method according to the invention can also be used for example for desalinization, in the cement industry or generally in power stations, which make use of fossil fuels.

LIST OF REFERENCE NUMERALS 10 device
12 receptacle
14 scrubbing liquid nozzles
16 scrubbing liquid sump
17 flue gas inlet
18 dividing wall
19 flue gas outlet
20 first basin
22 second basin
24 absorption area
25 pipe
26 pump device
28 upper side
30 pipe

The invention claimed is:
1. A device for desulphurization of flue gas comprising
a receptacle having scrubbing liquid nozzles arranged in a vertical orientation in an upper section of said receptacle and a scrubbing liquid sump for receiving scrubbing liquid in a lower section of said receptacle,
wherein said scrubbing liquid sump is divided into a first basin and a second basin by means of a dividing wall, wherein said dividing wall rises above the uppermost liquid level of the scrubbing liquid sump, wherein said dividing wall comprises means for level equilibration in said scrubbing liquid sump and allows a scrubbing liquid exchange between said basins, wherein an oxidation mean is provided at least in said first basin to selectively oxidize calcium sulphites to calcium sulphates.

2. The device according to claim 1, further comprising a scrubbing liquid analyser.

3. The device according to claim 2, wherein the scrubbing liquid analyser continuously analyses scrubbing liquid samples.

4. The device according to claim 1, wherein at least one side of a receptacle is formed such that the volume of an absorption area decreases from a flue gas inlet towards a flue gas outlet.

5. A method for flue gas desulphurization using a device according to claim 1, wherein during operation the scrubbing liquid contained in the first basin has a different additive concentration from a additive concentration of the scrubbing liquid contained in the second basin, wherein said device is operable to provide scrubbing liquid from the basin having a lower additive concentration for a preliminary purification of flue gas and to provide scrubbing liquid from the basin having a higher additive concentration for a final purification of the flue gas, wherein said device is operable to extract scrubbing liquid from the basin having the lower additive concentration exclusively for producing calcium sulphate.

6. A method according to claim 5, in which scrubbing liquid from at least one basin of said scrubbing liquid sump is pumped to scrubbing liquid nozzles.

7. The method according to claim 6, in which scrubbing liquid quantities, which have been pumped out of different basins of said scrubbing liquid sump and which have different compositions, are guided to different scrubbing liquid nozzles.

8. The method according to claim 5, wherein the scrubbing liquid of at least one of said basins of said scrubbing liquid sump is analysed.

9. The method according to claim 8, wherein the scrubbing liquid analysis is carried out continuously.

10. The method according to claim 5, wherein the flue gas, which is guided through an absorption area of said receptacle, is accelerated or slowed down.

* * * * *